Patented June 27, 1944

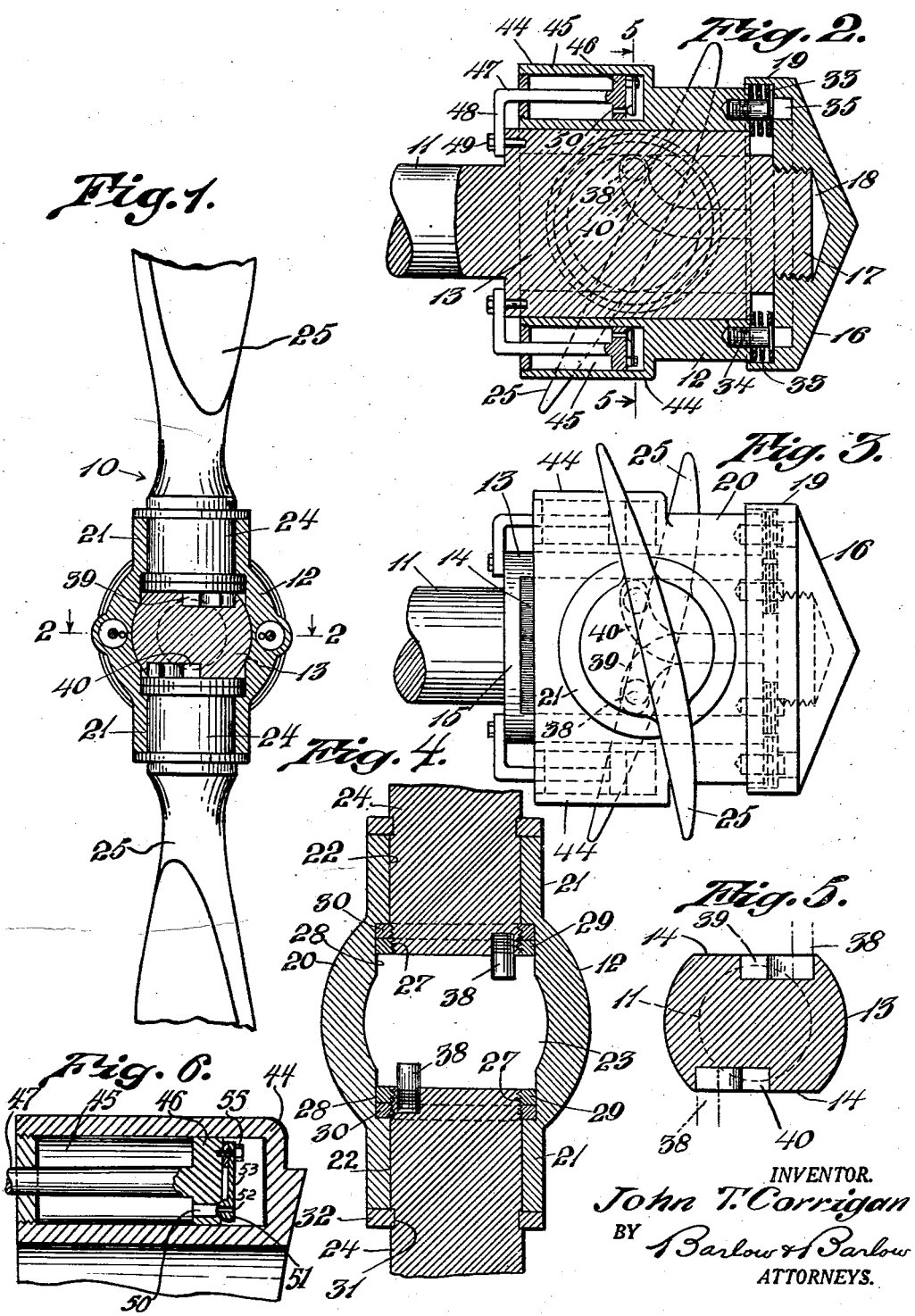

2,352,186

UNITED STATES PATENT OFFICE 2,352,186

VARIABLE PITCH PROPELLER

John T. Corrigan, Newport, R. I.

Application October 21, 1940, Serial No. 362,005

6 Claims. (Cl. 170—162)

This invention relates to constant speed or variable pitch propellers for aircraft; and has for one of its objects to provide an aeronautical propeller having adjustable blades the pitch of which is automatically adjusted by the motion of the aircraft to suit the conditions and speed prevailing during flight, at different altitudes and at the time of take-off.

Another object of the invention is to provide a variable pitch propeller wherein the blade pitch angles of the blades are automatically adjusted by and in response to the effect of the thrust and load conditions encountered at takeoff and when in flight.

Another object of the invention is to provide a full feathering propeller which will function by the action of its own air resistance as soon as the propeller stops turning or when it slows down below a pulling speed.

Another object of the invention is to prevent loss of speed of the aircraft through churning or turbulence at high speeds and during climbing.

Another object of the invention is the provision of hydraulic means to prevent vibration or fluttering of the propeller blades while at the same time allowing the gradual adjustment of pitch and a feathering of the blades in proportion to the prevailing thrust conditions.

Another object of the invention is to provide a variable pitch propeller in which the pitch angle of the propeller blades will be automatically adjusted into a proper pitch position during taking-off of the aircraft and then later adjusted when in flight into different increased pitched positions by and in response to the prevailing conditions of speed, propeller thrust, and air density after the aircraft has attained its normal level flight.

With these and other objects in view, the invention consists of certain novel features of construction, as will be more fully described, and particularly pointed out in the appended claims.

In the accompanying drawing:

Fig. 1 is a front elevational view, partly in section, of a propeller construction embodying the present invention;

Fig. 2 is an enlarged longitudinal sectional view taken axially along the line 2—2 of Fig. 1, showing the construction of the head portion of a propeller shaft, the hub for adjusting the blades about their axes, and the blade-angle setting assumed by the propeller when the airplane is cruising;

Fig. 3 is a plan view of the propeller assembly shown in Fig. 2 but depicting the blade-angle setting at the time of "take-off" and showing the propeller hub slid forwardly to reduce the blade pitch angle in response to the propeller thrust conditions at "take-off";

Fig. 4 is an enlarged central vertical sectional view of the slidable blade-actuating sleeve upon which are rotatably mounted the revolvable propeller blades, the sleeve assembly being shown without the propeller shaft;

Fig. 5 is a cross sectional view of the head portion of the propeller shaft taken on line 5—5 of Fig. 2 without the blade-actuating sleeve on which are mounted the rotary propeller blades;

Fig. 6 is an enlarged fragmentary detail in section of the hydraulic cushioning device on the propeller hub.

An airplane propeller when operating converts energy into thrust to propel an airplane through the air at high velocities due to the shape of the blades, which resembles that of an "airfoil." As the propeller rotates, one blade travels in the opposite direction to the other so that in passing through the atmosphere they both exert a lifting effect which, instead of being in a vertical direction as it would be in the case of an airfoil, provides a pull in a horizontal direction due to the component parallel to the propeller axis of the total air force on the propeller, commonly termed "thrust."

Airplane propellers are ordinarily classified into the following general types, viz., fixed pitch, adjustable pitch, controllable pitch, variable pitch, and constant speed propellers. In the fixed pitch propeller construction the blade angle is fixed, since the blades are permanently connected to the hub so that no adjustment can be made of the blade angle. The adjustable pitch propeller is one having detachable blades which are swivelly mounted in a split hub and the blade pitch can be changed and set into the desired pitch position only while the airplane is at rest on the ground with the propeller stationary.

The fixed pitch and the adjustable pitch propellers are little used on large or fast planes, since these propellers are usually designed to reach maximum efficiency when the plane speed and the engine R. P. M. attain their rated top speed allowed by the engine manufacturer and by the Department of Commerce regulations. Below this speed, both the propeller efficiency and that of the engine decrease rapidly so that at the time of "take-off" or in "climbing," where maximum power is necessary and high efficiency is desirable, the too large blade angle setting of these propellers will cause them to slow down and to decrease the engine R. P. M. so that the desirable high engine speeds for developing the maximum power of the engine necessary at the period of "take-off" or in "climbing" cannot be obtained and consequently the plane, when under a heavy load or on a short runway, often is unable to rise from the ground.

In order to overcome the aforementioned defects of the fixed pitch and the adjustable pitch propellers, air propellers having blades movable in flight are used in nearly all transport type airplanes of the present time and on military planes, and have been classed structurally as the last three types above-named. The controllable pitch propeller is one in which the blade pitch can be changed when the engine is running, and the plane in flight, there being ordinarily provided two blade angle settings, one for take-off and the other for normal cruising flight, and the blade pitch being controlled in flight by either mechanical means or by a hydraulic mechanism. The variable pitch propeller is one which is so constructed that the blades can be set to any selected blade angle when the plane is in flight. The constant speed propeller is one in which the pitch is controlled by a governor device which changes the blade pitch angle in flight automatically to the proper pitch to hold the engine R. P. M. to a constant speed.

It has already been mentioned that advantages of performance of an airplane are to be secured by changing the pitch of the operating propeller after the airplane has left the ground and in level flight since at the time of "take-off" or in "climbing" with the throttle opened wide, the pitch of the propeller should be at a low angle of attack so as to offer a minimum resistance to rotation and yet take the full power of the engine so that maximum efficiency is attained.

Once the plane is in the air and in level flight, the pitch of the propeller should be increased, since, if the blade angle setting is too small, the propeller will speed up or "race," as it is lightly loaded during this period, and thus increase the engine speed over its rated allowable R. P. M., which is detrimental to its life and reliability.

Heretofore, many interesting mechanically, hydraulically, or electrically operated changeable pitch air propeller constructions of the three types last-named have been devised and successfully applied. However, such prior pitch-changing mechanisms have been of large size and complicated in their construction; and in order to secure the same advantageous results with a more simplified and less expensive construction of blade pitch-changing mechanism, the present invention contemplates a novel variable pitch air propeller whose blade pitch can be changed by the force of, and in ratio to, the thrust of the rotating propeller due to its reaction upon a mass perpendicular to the plane of rotation of the propeller whereby the pitch will be set automatically when the engine is running, to the proper blade-angle, whereby the propeller will absorb all of the available power of the engine at any given speed and thereby will offer sufficient resistance to hold the speed of the engine to its normal engine R. P. M. at any throttle to provide efficient operation of the propeller; and in order to secure these desirable results there is provided a propeller construction in which the blades are arranged to not only turn about their longitudinal axes for pitch changing but also one in which the entire hub mounting for the blades including the blades is bodily movable axially along the propeller shaft during adjustment of the blade-pitch angles, this reciprocating movement of the propeller hub along the propeller shaft when the propeller is operating being imparted thereto by the thrust of the blades of the propeller against the air; and there is also provided means normally tending to urge the blades into a high-pitch position against the thrust of the rotating propeller and normally tending to hold them in such position when the aircraft is in flight; and in order to rotate the blades to change their pitch, as during take-off, there is provided a crank mechanism operatively connected to the root portion of each blade and located between the same and the portion of the propeller drive shaft which carries the axially-movable support for the blades by which pressure is applied to automatically adjust the pitch of the blades of the rotating propeller upon axial reciprocatory movement of the mounting for the propeller blades in response to the variations in load pressures to turn the blades about their longitudinal axes to the proper blade angle for the particular load conditions and thus maintain the engine speed at a constant speed to give the most efficient propeller operation; and hydraulic means also are provided to prevent fluttering of the propeller blades; other means are provided for preventing churning or turbulence at high speeds and a full feathering propeller action; and additional means are provided to eliminate the vacuum effect created in the propeller path at high speeds; and the following is a more detailed description of the present embodiment of this invention, illustrating the preferred means by which these advantageous results may be accomplished:

With reference to Figs. 1 to 5 of the drawing, 10 generally designates the air propeller assembly, and 11, the forwardly extending end portion of the propeller shaft of an airplane engine (not shown), the shaft being rotatably mounted on the engine in the conventional manner. A propeller hub 12 is loosely mounted on the shaft 11 for rotation with the same and for longitudinal sliding movement therealong upon the enlarged head portion 13 which is integrally formed on the forepart of the propeller shaft. This head is shown as being of partially cylindrical shape, and it is provided with a plurality of exterior flat portions 14, in the present instance two being illustrated and located at diametrically opposite positions on the head 13, although it will be apparent that the arrangement need not be necessarily limited to that particular number, since it will be readily apparent in view of the features of construction as will be hereinafter described that the number of flat portions provided should at least correspond to the number of blades employed in the propeller, which flat portions 14 extend inwardly of the propeller shaft in a direction substantially parallel to its axis and are of such length as to provide a long support for the hub 12 to accommodate the inward and outward axial reciprocatory movements of the same along the head 13 to the desired extent. A flange 15 integrally formed at the inward end of each of the flats 14 provides an abutment for limiting the inward sliding movement of the hub 12. The hub 12 is held onto the propeller shaft by means of the conically-nosed cap 16 which is secured to the threaded end portion 17 of the shaft by means of the internally screw-threaded recessed portion 18. The cap 16 is provided with a circular skirt portion 19 of larger diameter than the hub 12 and this skirt telescopes over the forward end of the hub in all its different adjusted positions, as will be apparent from Figs. 2 and 3 of the drawing.

The propeller hub 12 comprises a generally sleeve-like body portion 20 from the outer peripheral surface of which extends outwardly a plurality of tubular radial bosses 21, in the present instance two being shown located at diametrically opposite positions on the hub, although the arrangement is not to be limited to this particular number since it will be readily apparent that three or four bosses may be employed depending upon the number of propeller blades used and located at equal arcuate distances on the hub so as to obtain proper balance, and the bores 22 of these bosses open at their lower ends into a large central recess 23 on the inside of the hub 12. Rotatably mounted in the bores 22 of the bosses are the roots or shank portions 24 of the propeller blades 25 which project radially outwardly from the hub 12.

The propeller blades 25 are of the conventional shape for airplane propeller blades insofar as their surface contour, diameter, and aerodynamic qualities of the airfoil section are concerned.

The roots or shank portions 24 of the blades 20 may be rotatably mounted in suitable annular antifriction bearings positioned within the bores 30 of the bosses 21, as is well-known practice in the art. As illustrated in Fig. 4, the inner ends of these roots are provided with threaded portions 27 which extend into the circular recesses 28 located at opposite sides of the central opening 23 of the hub and are retained in the bores 22 by the annular lock nuts 29 and 30 positioned within the recesses 28 and threaded onto the threaded end portions 27. The outer portions of the roots are provided with annular grooves 31 to receive split collars, such as 32, which are fixedly secured to the bosses and take the centrifugal pull of the propeller blades when in operation.

When the propeller blades 25 are thus mounted, the central recess 23 of the hub 12 will have substantially the same cross-sectional shape as that of the head 13 and will be of a size as to receive the same and provide a sliding fit thereon.

A plurality of coil springs 33 loosely mounted on studs 34 fixed in the front face of the hub 12 are positioned around the head 13 at equally spaced distances from each other and from the axis of the shaft 10, one end of the springs pressing against the cap 16 and the other end pushing against the forward end face of the hub 12, whereby the force of the springs will act to oppose the forward movement of the hub in "flight" and also automatically restore the hub 12 into abutting engagement with the flanges 15 for maintaining the coarsest pitch of the blades when the propeller is "idling." An annular recess 35 in the rear face of the cap 16 is provided to receive the free ends of the studs 34 when the hub 12 slides forwardly for varying the pitch angle of the blades.

In order to rotate the propeller blades on an axis transverse to the axis of the propeller shaft 11 to change their pitch and also to cause axial shifting of the hub 12, there is provided means positioned between the inner ends of the roots 24 and the enlarged head portion 13 of the propeller shaft 11 so arranged that the thrust of the propeller blades due to impingement against the air in "taking off" or in "climbing" when increased thrust is applied to the propeller will act to force the hub 12 from the position shown in Fig. 2 into the position shown in Fig. 3 against the restraining action of the springs 33 to decrease the working pitch of the propeller. To this end, a pair of studs 38 are fixedly secured at one end in the inner ends of the roots 24 of the propeller blades 25, the studs 38 being disposed with their axes offset from the axes of the blades and having their free ends extending into and engaging the sidewalls of the J-shaped grooves or recesses 39 and 40 formed in the flat faces 14 of the enlarged head portion 13. As shown in Fig. 3, the straight shank portions of these J-shaped grooves are located at diametrically opposite positions on the head 13, and they extend inwardly from its forward end face with their curved inner end portions being directed outwardly and laterally of the flats 14 in opposite directions to each other.

In order to stabilize, restrain and cushion the reciprocating movements of the blade-actuating sleeve portion 20 of the propeller hub 12 so as to prevent vibration or fluttering of the propeller blades while at the same time permit a gradual adjustment of the blade-pitch angles and feathering of the propeller blades in proportion to the prevailing thrust conditions, there is provided as a further feature of the invention hydraulic cushioning means in the form of a dash-pot mechanism which is so arranged as to cushion the rearward thrust of the sleeve and also hold the sleeve against too rapid forward travel. To this end, the sleeve 20 is provided at diametrically opposite positions with the protuberant portions 44 formed with the closed chambers 45 which are filled with oil or some suitable fluid and accommodate a piston 46 relative to which the chambers have reciprocatory movement. The piston 46 is carried by the inner end of the piston rod 47 while the outer end of the rod is bent as at 48 and rigidly attached to the rear face of the head portion 13 in any suitable manner, such as by means of bolts 49. As shown in Fig. 6, each piston 46 is provided with a large hole 50, the front end opening of which is normally covered by a valve member 51 of semispherical contour and also having a small hole 52 which is of smaller diameter than the hole 50 in the piston and in alignment with the same. The valve 51 is loaded by a leaf spring 53 which is suitably affixed at one end to the piston 46 as by a bolt 55 whereby the valve 51 will be yieldable in one direction when oil at the back portion of the piston is forced through the large hole 50 to force open the valve 51 and flow past the same during forward sliding movement of the sleeve 20 with its chamber portions 45 into any of its different forwardly adjusted positions on the head 13, as will occur when the blade-pitch angles are being automatically decreased from their maximum pitch angle position to a pitch angle to keep within the capacity of the engine to maintain its most efficient power, such as would occur for example at the time of "take-off" or in "climbing" where the increased power incidental to high engine speed is desirable, and in order that rapid forward movement of the sleeve 20 and a fast flow of oil from one side of the piston to the other can take place to allow the blades to open wide with less restraining action of the cushioning device 44.

The propeller blades assume their coarser or maximum pitch due to their normal urge in that direction because of their lack of impingement against the air and causes rearward movement of the sleeve 20 to force oil through the holes 52 and 50 from the front portion of the chambers 45 ahead of the pistons 46 and discharge it into the back portion of the chambers, this reverse flow of the oil acting to hold the valve 51 seated in the front end opening of the hole 50 so that the oil under pressure escapes through the hole 52 which is of such size as to permit yet limit the quantity of oil passing therethrough and thus control the rate of flow of the same and retard the vibration incident to rearward movement of the sleeve 20 until the blades have attained their maximum pitch angles with the flange 15 abutting the back end face of the propeller hub 20.

When the propeller in the arrangement above described and shown in Figs. 1 to 5 is rotating at a high speed prior to the take-off of the airplane on which the propeller is mounted, the propeller hub will be caused to move forwardly on the enlargement 13 due to the thrust or forward push or pull exerted by the rotating blades of the propeller. As a consequence thereof the pins 38 carried by the blades of the propeller and in engagement with the walls of the grooves 39 and 40 will cause a turning of the blades about their own longitudinal axis and position the blades at a low pitch angle setting of take-off. As the airplane rises in the air and gains velocity the thrust of the propeller decreases and the pressure exerted on the hub 12 by the springs 33 becomes sufficient to move the hub 12 rearwardly on the enlargement 13 which through the interconnection means above described turns the blades about their longitudinal axis in a direction to increase the pitch angle of the blades.

Upon failure of the engine the thrust on the propeller due to the forward movement of the airplane will force the hub 12 in its most rearward position and by properly designing the cam grooves 39 and 40 such rearwardly movement of the hub 12 will cause a turning of the blades about their axis in a direction to feather the same.

I claim:

1. A variable air propeller comprising a hub having a plurality of blades rotatably mounted thereon, a rotatable shaft drivably connected with the hub, said hub being automatically movable axially of said shaft, means interconnecting said shaft and blades for turning said blades about their longitudinal axis during such axial movement of the hub for varying the pitch of the blades, and hydraulically operable cushioning means operable to provide a greater resistance to the movement of said hub in one direction than in the other comprising a cylinder member and a piston member therein, one of which members is attached to said hub and the other of which members is attached to the shaft, and means carried by the piston member presenting an opening of one size upon relative movement of the members in one direction and an opening of a different size upon relative movement of the members in the other direction for the control of the flow of fluid in said cylindrical member.

2. A variable air propeller comprising a hub having a plurality of blades rotatably mounted thereon, a rotatable shaft drivably connected with the hub, said hub being automatically movable axially of said shaft, means interconnecting said shaft and blades for turning said blades about their longitudinal axis during such axial movement of the hub for varying the pitch of the blades, and hydraulically operable cushioning means operable to provide a greater resistance to the movement of said hub in one direction than in the other comprising a cylinder member, a piston member relatively movable in said cylinder member and having an opening therein for the flow of fluid from one side of said piston member to the other and a valve on said piston member for controlling the flow of fluid through said opening, one of said members being attached to said hub and the other of said members being attached to said shaft.

3. A variable air propeller comprising a hub having a plurality of blades rotatably mounted thereon, a rotatable shaft drivably connected with the hub, said hub being automatically movable axially of said shaft, means interconnecting said shaft and blades for turning said blades about their longitudinal axis during such axial movement of the hub for varying the pitch of the blades, and hydraulically operable cushioning means operable to provide a greater resistance to the movement of said hub in one direction than in the other comprising a cylinder member, a piston member relatively movable in said cylinder member and having an opening therein for the flow of fluid from one side of said piston member to the other and a valve on said piston member for controlling the flow of fluid through said opening, said valve being operable by the action of the fluid flowing through said opening, one of said members being attached to said hub and the other of said members being attached to said shaft.

4. A variable air propeller comprising a hub having a plurality of blades rotatably mounted thereon, a rotatable shaft drivably connected with the hub, said hub being automatically movable axially of said shaft, means interconnecting said shaft and blades for turning said blades about their longitudinal axis during such axial movement of the hub for varying the pitch of the blades, and hydraulically operable cushioning means operable to provide a greater resistance to the movement of said hub in one direction than in the other comprising a cylinder member, a piston member relatively movable in said cylinder member and having an opening therein for the flow of fluid from one side of said piston member to the other, one of said members being attached to said hub and the other of said members being attached to said shaft, a flexible element carried by said piston member and having an apertured enlargement fixed thereto normally urged into engagement with the entrance of said opening to restrict the flow of fluid through said opening when said piston member is relatively moved in said cylinder member in one direction and said enlargement being moved out of engagement with said opening by the flow of fluid therethrough when said piston member is relatively moved in the opposite direction.

5. A variable air propeller comprising a hub having a plurality of propeller blade mountings rotatably secured thereon, a rotatable shaft having an end portion slidably received within said hub and provided with opposed flat surfaces slidably engageable with the lower end surface of said mountings for drivably connecting said shaft and hub, each of said flat portions having a cam groove therein one end of which opens into an end surface on said shaft, each of said mountings having a stud extending therefrom into said groove to engage the walls thereof to rotate said mounting upon relative movement thereof, an abutment fixed to the end portion of said shaft and provided with a recess therein of a dimension to receive the adjacent end portion of said hub, said abutment having a plurality of openings therein, guide pins carried by said hub and slidingly received in said openings, and compression springs encircling said guide pins and engaging said hub and said cap for urging said hub in a direction to oppose axial movement of said hub towards said abutment.

6. A variable air propeller comprising a hub having a plurality of propeller blade mountings rotatably secured thereon, a rotatable shaft having an end portion slidably received within said hub and provided with opposed flat surfaces slidably engageable with the lower end surface of said mountings for drivably connecting said shaft and hub, each of said flat portions having a cam groove therein one end of which opens into an end surface on said shaft, each of said mountings having a stud extending therefrom into said groove to engage the walls thereof to rotate said mounting upon relative movement thereof, an abutment fixed to the end portion of said shaft and provided with a recess therein of a dimension to receive the adjacent end portion of said hub, said abutment having a plurality of openings therein, guide pins carried by said hub and slidingly received in said openings, and compression springs encircling said guide pins and engaging said hub and said cap for urging said hub in a direction to oppose axial movement of said hub towards said abutment, and means to cushion the axial sliding movement of said hub in one direction and to permit rapid axial sliding of the same in the opposite direction, comprising a cylinder carried by the hub and a piston fixed to said shaft and slidably received in said cylinder, said piston having an opening therein and means operable by the action of the fluid in said cylinder to regulate the flow of fluid through said opening from one side of the piston to the other.

JOHN T. CORRIGAN.